United States Patent
Sanda et al.

(10) Patent No.: US 9,309,918 B2
(45) Date of Patent: Apr. 12, 2016

(54) BEARING STRUCTURE FOR INTERNAL COMBUSTION ENGINE

(71) Applicant: KABUSHIKI KAISHA TOYOTA CHUO KENKYUSHO, Nagakute-shi, Aichi-ken (JP)

(72) Inventors: Shuzou Sanda, Nagoya (JP); Takashi Shimazu, Nagoya (JP); Yasuhiro Ohmiya, Seto (JP); Yoshihiro Hotta, Nagoya (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 14/696,999

(22) Filed: Apr. 27, 2015

(65) Prior Publication Data

US 2015/0226255 A1 Aug. 13, 2015

Related U.S. Application Data

(62) Division of application No. 14/003,316, filed as application No. PCT/JP2012/056262 on Mar. 12, 2012, now Pat. No. 9,046,125.

(30) Foreign Application Priority Data

Mar. 23, 2011 (JP) .................................. 2011-064144

(51) Int. Cl.
*F16C 9/02* (2006.01)
*F16C 33/10* (2006.01)
(Continued)

(52) U.S. Cl.
CPC .................. *F16C 9/02* (2013.01); *F01M 5/001* (2013.01); *F01M 5/02* (2013.01); *F16C 3/14* (2013.01);
(Continued)

(58) Field of Classification Search
CPC ................ F16C 3/14; F16C 3/16; F16C 9/02;
F16C 17/02; F16C 33/667; F16C 35/02;
F16C 2202/24; F01M 5/02; F01M 5/001;
F01M 5/002; F01M 2011/026; F02F 7/0053;
F02B 77/11
USPC ......................... 384/250, 397, 429, 432, 434;
123/196 A, 142.5 R, 196 AB
See application file for complete search history.

(56) References Cited

U.S. PATENT DOCUMENTS 2,930,603 A   3/1960   Voss et al.
3,315,648 A   4/1967   del Castillo
(Continued)

FOREIGN PATENT DOCUMENTS

DE         2952346 A1      6/1981
DE       10136171 A1 *    2/2003   ............... F01M 5/02
(Continued)

OTHER PUBLICATIONS

May 22, 2012 International Search Report issed in International Patent Application No. PCT/JP2012/056262.
(Continued)

*Primary Examiner* — Marcus Charles
(74) *Attorney, Agent, or Firm* — Oliff PLC

(57) ABSTRACT

When temperature of lubricating oil is raised at a time of low-temperature, of an outer peripheral side of a radial plain bearing in a bearing retaining unit, heat is not supplied from a heating medium in a thermal medium flow path on the outer peripheral side of a halved bearing metal in a bearing retaining unit body, which has a large thermal capacity, and instead, heat is supplied from the heating medium in the thermal medium flow path on the outer peripheral side of a halved bearing metal in the cap, which has a small thermal capacity.

4 Claims, 13 Drawing Sheets

(51) Int. Cl.

| | | |
|---|---|---|
| F16C 17/02 | (2006.01) | |
| F01M 5/00 | (2006.01) | |
| F01M 5/02 | (2006.01) | |
| F16C 3/14 | (2006.01) | |
| F16C 33/66 | (2006.01) | |
| F16C 35/02 | (2006.01) | |
| F16C 3/16 | (2006.01) | |
| F16C 41/00 | (2006.01) | |
| F01M 11/02 | (2006.01) | |

(52) U.S. Cl.
CPC . *F16C 3/16* (2013.01); *F16C 33/10* (2013.01); *F16C 33/1025* (2013.01); *F16C 33/667* (2013.01); *F16C 35/02* (2013.01); *F16C 41/00* (2013.01); *F01M 2011/026* (2013.01); *F16C 17/02* (2013.01); *F16C 2202/20* (2013.01); *F16C 2202/24* (2013.01)

(56) References Cited

U.S. PATENT DOCUMENTS

| | | | |
|---|---|---|---|
| 4,312,251 A | | 1/1982 | Schwan |
| 4,480,956 A | | 11/1984 | Kruger et al. |
| 4,815,431 A | | 3/1989 | Yorita et al. |
| 5,979,420 A | * | 11/1999 | Kawamura ................... 123/557 |
| 6,510,830 B2 | * | 1/2003 | Rossiter ................... 123/196 AB |
| 7,363,905 B2 | | 4/2008 | Schaller |
| 8,047,165 B2 | * | 11/2011 | Ito et al. ..................... 123/41.01 |
| 2012/0285401 A1 | * | 11/2012 | Quiring et al. ............. 123/41.08 |

FOREIGN PATENT DOCUMENTS

| | | | | |
|---|---|---|---|---|
| EP | 0 863 326 A2 | | 9/1998 | |
| FR | 2704275 A1 | | 10/1994 | |
| GB | 190126401 A | | 10/1902 | |
| GB | 2472228 A | * | 2/2011 | ............... F01M 5/02 |
| JP | S61-20921 U | | 2/1986 | |
| JP | S61-198508 U | | 12/1986 | |
| JP | H06-74230 A | | 3/1994 | |
| JP | H06-74237 A | | 3/1994 | |
| JP | H06-330932 A | | 11/1994 | |
| JP | H08-144730 A | | 6/1996 | |
| JP | H10-235500 A | | 9/1998 | |
| JP | 2005-220770 A | | 8/2005 | |
| JP | 2009-144623 A | | 7/2009 | |
| JP | 2009-150382 A | | 7/2009 | |
| JP | 2010-127375 A | | 6/2010 | |

OTHER PUBLICATIONS

Mar. 12, 2015 Japanese Office Action issued in Japanese Patent Application No. 2011-064144.

* cited by examiner

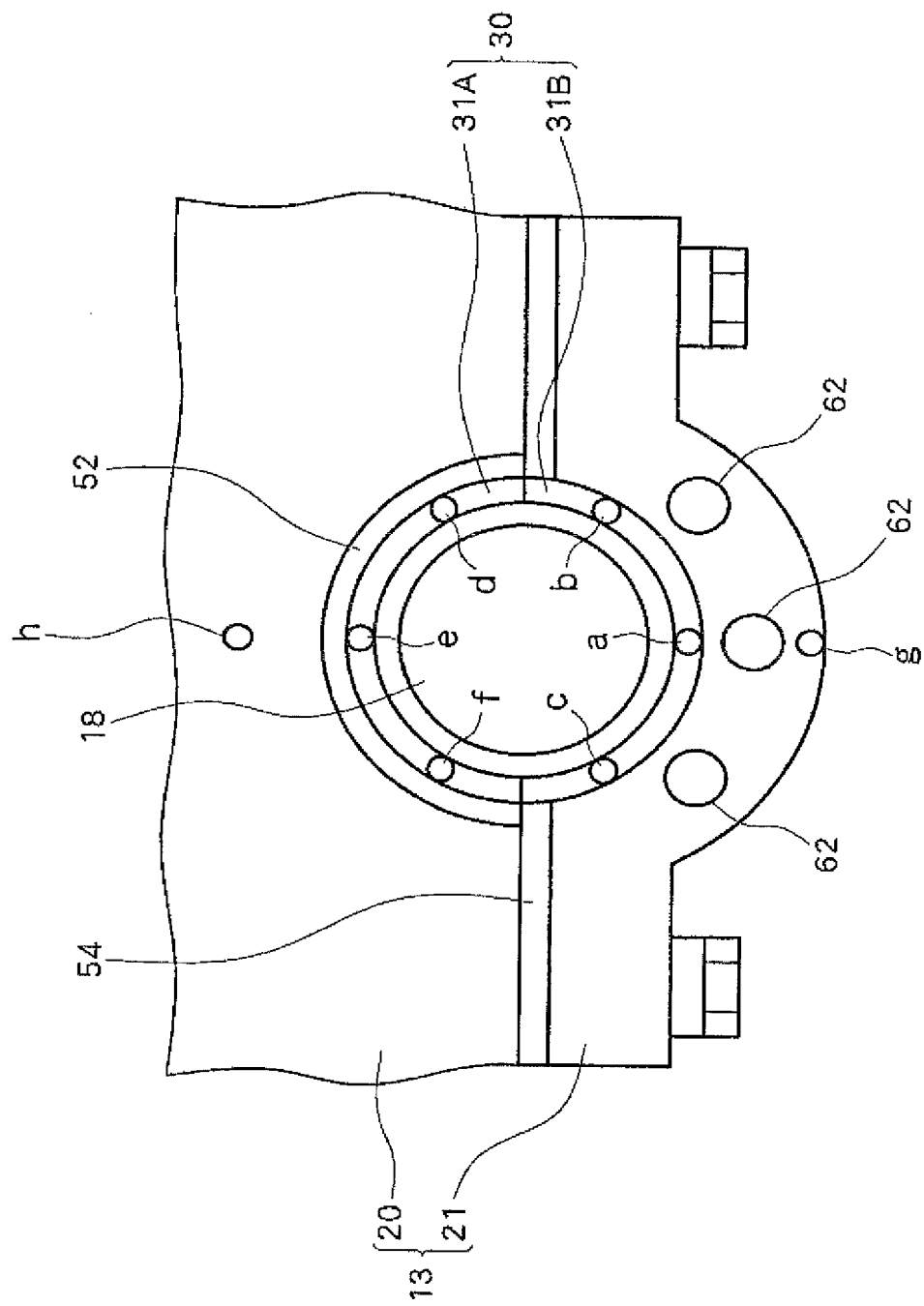

BEARING STRUCTURE FOR INTERNAL COMBUSTION ENGINE

CROSS REFERENCE TO RELATED APPLICATIONS

This is a Division of application Ser. No. 14/003,316, filed Sep. 5, 2013 and having issued as U.S. Pat. No. 9,046,125, which in turn is a U.S. national phase of PCT/JP2012/056262, filed Mar. 12, 2012, which claims foreign priority to JP 2011-064144, filed Mar. 23, 2011. The disclosure of the prior applications is hereby incorporated by reference herein in its entirety.

TECHNICAL FIELD

The present invention relates to a bearing structure for an internal combustion engine, and in particular to a bearing structure for an internal combustion engine in which a rotational shaft of the internal combustion engine is supported by a radial plain bearing via lubricating oil, and the radial plain bearing is retained by a bearing retaining unit.

BACKGROUND ART

Patent Document 1 discloses a technique related to a bearing structure in which a rotational shaft of an internal combustion engine is supported by a radial plain bearing via lubricating oil. In Patent Document 1, a PTC heater is provided opposing an outer peripheral surface of a radial plain bearing mounted on a cylinder block and a bearing cap of an engine, and a thermal insulation material is provided on a side, of the PTC heater, opposite (outer peripheral side) to the side opposing the outer peripheral surface of the radial plain bearing. During a cold start of the engine, the radial plain bearing is heated by the PTC heater such that the lubricating oil filled between the radial plain bearing and a crank shaft is heated. With this configuration, viscosity of the lubricating oil filled between the radial plain bearing and the crank shaft is reduced, and a viscous frictional loss when the crank shaft is rotated is reduced.

RELATED ART REFERENCES

Patent Document

[Patent Document 1] JP 2010-127375 A
[Patent Document 2] JP 2009-144623 A
[Patent Document 3] JP 6-74237 A
[Patent Document 4] JP 6-74230 A

DISCLOSURE OF INVENTION

Technical Problem

In Patent Document 1, the PTC heater is provided over the entirety of the outer periphery of the radial plain bearing, and the radial plain bearing is heated over the entire periphery by the PTC heater. For this process, a thermal insulating material is provided on the outer peripheral side of the PTC heater, but in reality, complete insulation of heat is difficult, and the heat of the PTC heater is transferred not only to the radial plain bearing on the inner peripheral side, but also to the cylinder block and the bearing cap on the outer peripheral side. When the heat of the PTC heater diffuses to the cylinder block having a large thermal capacity, of the amount of heat supplied from the PTC heater, the percentage of the amount of heat consumed for raising the temperature of the cylinder block becomes large, and consequently, the percentage of the amount of heat used for raising the temperature of the lubricating oil filled between the radial plain bearing and the crank shaft is reduced. Therefore, in Patent Document 1, a large amount of heat must be supplied from the PTC heater in order to heat the lubricating oil filled between the radial plain bearing and the crank shaft, and efficient raising of the temperature of the lubricating oil is difficult.

An advantage of the present invention is that, in a structure in which the rotational shaft of the internal combustion engine is supported by the radial plain bearing via the lubricating oil, the temperature of the lubricating oil is efficiently raised at the time of low-temperature.

Solution to Problem

A bearing structure for an internal combustion engine according to the present invention employs the following configurations in order to achieve the advantage described above.

According to one aspect of the present invention, there is provided a bearing structure for an internal combustion engine in which a rotational shaft of an internal combustion engine is supported by a radial plain bearing via lubricating oil and the radial plain bearing is retained by a bearing retaining unit, the bearing structure comprising a heat supplying device which supplies heat on an outer peripheral side of the radial plain bearing in the bearing retaining unit, wherein the bearing retaining unit comprises a bearing retaining unit body and a cap which is fastened to the bearing retaining unit body and which has a smaller thermal capacity than the bearing retaining unit body, the radial plain bearing comprises a first halved bearing retained on the bearing retaining unit body and a second halved bearing retained on the cap, and of an outer peripheral side of the first halved bearing in the bearing retaining unit body and an outer peripheral side of the second halved bearing in the cap, the heat supplying device supplies heat on the outer peripheral side of the second halved bearing in the cap and does not supply heat on the outer peripheral side of the first halved bearing in the bearing retaining unit body.

According to the above-described configuration, diffusion, to the bearing retaining unit body having a large thermal capacity, of the heat supplied from the heat supplying device at the time of low-temperature when the viscosity of the lubricating oil is high can be suppressed, and a percentage of the amount of heat, of the amount of heat supplied from the heat supplying device, used for raising temperature of the lubricating oil supplied in a gap between the radial plain bearing and the rotational shaft can be increased. Therefore, the temperature of the lubricating oil can be efficiently raised and the viscosity can be efficiently reduced.

According to another aspect of the present invention, preferably, the heat supplying device supplies heat of a heating medium flowing through a thermal medium flow path, and of the outer peripheral side of the first halved bearing in the bearing retaining unit body and the outer peripheral side of the second halved bearing in the cap, the thermal medium flow path is formed on the outer peripheral side of the second halved bearing in the cap and is not formed on the outer peripheral side of the first halved bearing in the bearing retaining unit body.

According to another aspect of the present invention, preferably, the heat supplying device also functions as a cooling device utilizing a cooling medium flowing through the thermal medium flow path in place of the heating medium.

According to another aspect of the present invention, preferably, a heater is provided as the heat supplying device, and of the outer peripheral side of the first halved bearing in the bearing retaining unit body and the outer peripheral side of the second halved bearing in the cap, the heater is provided on the outer peripheral side of the second halved bearing in the cap and is not provided on the outer peripheral side of the first halved bearing in the bearing retaining unit body.

According to another aspect of the present invention, preferably, the heat supplying device supplies heat of the lubricating oil flowing through a heat exchange oil path to which the lubricating oil is supplied from a gap between the radial plain bearing and the rotational shaft, and of the outer peripheral side of the first halved bearing in the bearing retaining unit body and the outer peripheral side of the second halved bearing in the cap, the heat exchange oil path is formed on the outer peripheral side of the second halved bearing in the cap and is not formed on the outer peripheral side of the first halved bearing in the bearing retaining unit body.

According to another aspect of the present invention, preferably, in the gap between the radial plain bearing and the rotational shaft, both ends are narrower than the other portions in relation to the rotational shaft direction.

According to another aspect of the present invention, preferably, the cap is fastened to the bearing retaining unit body via a thermal insulation layer.

According to another aspect of the present invention, preferably, a thermal insulation layer is provided on the outer peripheral side of the first halved bearing.

According to another aspect of the present invention, preferably, a thermal insulation layer is provided on an outer peripheral side of the heat supplying device.

According to another aspect of the present invention, preferably, the cap is fastened to the bearing retaining unit body by a bolt, and a thermal insulation material ring is provided between a head of the bolt and the cap.

According to another aspect of the present invention, preferably, a thermal insulation layer is provided on an outer peripheral surface of the rotational shaft.

Advantageous Effects of Invention

As described above, according to various aspects of the present invention, in a structure in which the rotational shaft of the internal combustion engine is supported by the radial plain bearing via the lubricating oil, the temperature of the lubricating oil can be efficiently raised at the time of low-temperature.

BRIEF DESCRIPTION OF DRAWINGS

FIG. 15 is a diagram schematically showing another configuration of the bearing structure for an internal combustion engine according to the preferred embodiment of the present invention.

BEST MODE FOR CARRYING OUT THE INVENTION

A preferred embodiment of the present invention (hereinafter referred to as "embodiment") will now be described with reference to the drawings.

Figure 1A:
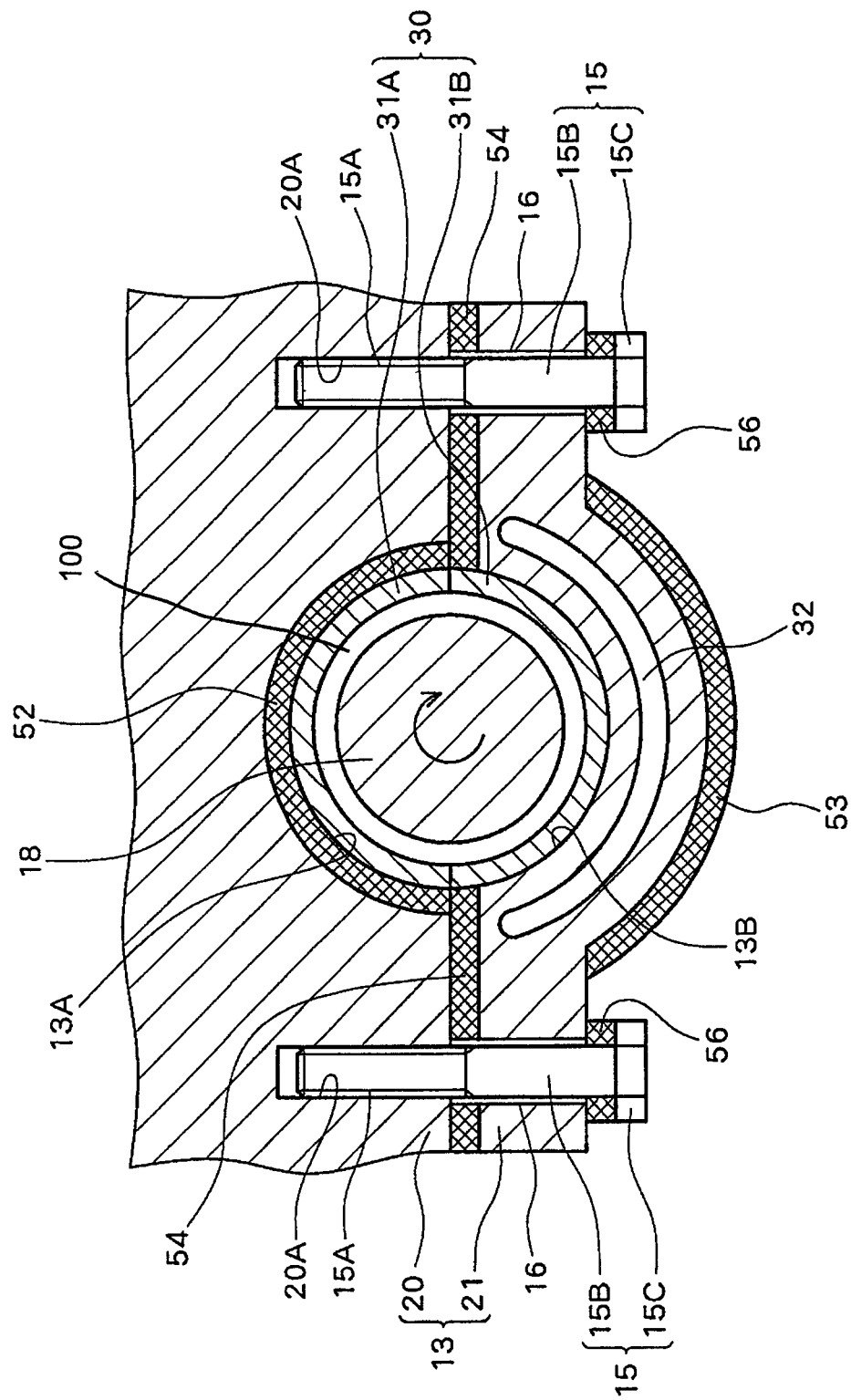
FIG. 1A is a diagram schematically showing a configuration of a bearing structure for an internal combustion engine according to a preferred embodiment of the present invention.
Figure 1B:
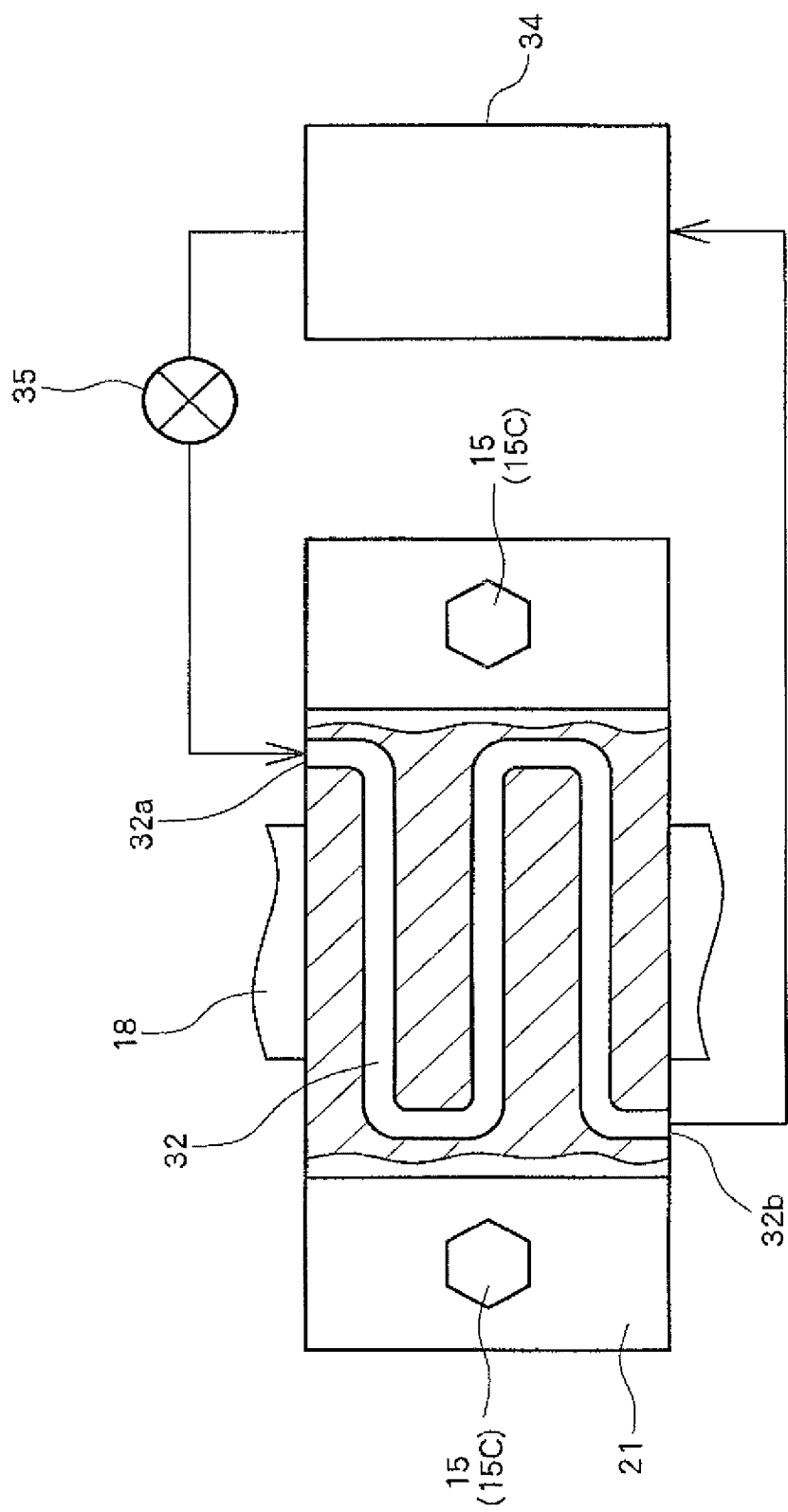
FIG. 1B is a diagram schematically showing a configuration of the bearing structure for an internal combustion engine according to the preferred embodiment of the present invention.

FIGS. 1A and 1B are diagrams schematically showing a configuration of a bearing structure for an internal combustion engine according to an embodiment of the present invention. FIG. 1A is a cross-sectional diagram of the bearing structure viewed from a rotational shaft direction of the bearing structure, and FIG. 1B is an internal structural diagram of the bearing structure viewed from a direction perpendicular to the rotational shaft direction. In the bearing structure for an internal combustion engine according to the present embodiment, a crank journal 18 of a crank shaft which is a rotational shaft of the internal combustion engine is supported by a radial plain bearing (which is also called a journal plain bearing) 30 via lubricating oil, and the radial plain bearing 30 is retained by a bearing retaining unit 13. In the figures including FIGS. 1A and 1B, a thickness of the radial plain bearing 30 and the size of the gap between the radial plain bearing 30 and the crank journal 18 or the like are shown larger than the actual size for the purpose of explanation.

The bearing retaining unit 13 comprises a bearing retaining unit body 20 formed by a portion of a cylinder block of the internal combustion engine, and a cap 21 which is fastened to the bearing retaining unit body 20. For the bearing retaining unit 13 (the bearing retaining unit body 20 and the cap 21), a metal material such as iron and aluminum is used. A volume of the bearing retaining unit body 20 is larger than a volume of the cap 21, and a thermal capacity of the bearing retaining unit body 20 is larger than a thermal capacity of the cap 21. In the bearing retaining unit body 20, a bearing mounting surface 13A which is a concave curved surface having an approximately semi-cylindrical shape is formed, and on the cap 21, a bearing mounting surface 13B which is a concave curved surface having an approximately semi-cylindrical shape is formed. The cap 21 is fastened to the bearing retaining unit body 20 by a bolt 15 which is a fastening member so that a through hole through which the crank journal 18 is inserted is formed between the bearing mounting surfaces 13A and 13B. More specifically, a bolt through hole 16 having a slightly larger diameter than a diameter of a shaft portion 15B of the bolt 15 is formed on the cap 21, and a male screw 15A of the bolt 15 inserted through the bolt through hole 16 is screw-engaged with a female screw 20A formed on the bearing retaining unit body 20 so that a head 15C of the bolt 15 contacts the cap 21 and the cap 21 is fastened to the bearing retaining unit body 20. The radial plain bearing 30 having a halved structure is mounted on the bearing mounting surfaces 13A and 13B and is retained on the bearing retaining unit 13.

The radial plain bearing 30 comprises halved bearing metals 31A and 31B divided into two in a circumferential direction of the rotational shaft and having an approximately semi-cylindrical shape. One halved bearing metal 31A is mounted and retained on the bearing mounting surface 13A of the bearing retaining unit body 20 to oppose the bearing mounting surface 13A, and the other halved bearing metal 31B is mounted and retained on the bearing mounting surface 13B to oppose the bearing mounting surface 13B. The ends in the circumferential directions of the two halved bearing metals 31A and 31B are combined to form the radial plain bearing 30. Each of the halved bearing metals 31A and 31B comprises a back plate and a bearing alloy layer serving as a lining layer formed on an inner peripheral side of the back plate. Examples of the types of the back plate include steel or the like, and examples of the type of the bearing alloy layer include a copper-lead alloy, an aluminum alloy, or the like. The radial plain bearing 30 having the halved structure rotatably supports the crank journal 18 via the lubricating oil, to receive a load along a radial direction of the crank journal 18 via the lubricating oil. Primary functions of the lubricating oil in this structure are formation of an oil film so that the mechanism is driven without seizure of the rotational shaft and the bearing, and reduction of the frictional loss and wear between the rotational shaft and the bearing, but the lubricating oil also has the functions of cooling, cleaning, rust-prevention, or the like. In FIG. 1A, a structure for supplying the lubricating oil to a gap 100 between an inner peripheral surface of the radial plain bearing 30 and the outer peripheral surface of the crank journal 18 is illustrated, but the supplying structure can be realized with known structures.

In the present embodiment, a thermal medium flow path 32 is formed as a heat supplying device for supplying heat at a position on the outer peripheral side of the radial plain bearing 30 in the bearing retaining unit 13, and a heating medium having heat accumulated by a heat accumulating device 34 is supplied to the thermal medium flow path 32 so that the heat of the heating medium flowing through the thermal medium flow path 32 is supplied. For the heating medium here, for example, oil and an exhaust gas of the internal combustion engine, or the like, may be employed. A heating medium supply control valve 35 is provided between the heat accumulating device 34 and an inlet 32a of the thermal medium flow path 32, so that a supply state of the heating medium from the heat accumulating device 34 to the thermal medium flow path 32 can be controlled by the heating medium supply control valve 35. When the heating medium supply control valve 35 is opened, supply of the heating medium from the heat accumulating device 34 to the thermal medium flow path 32 is enabled, and when the heating medium supply control valve 35 is closed, the supply of the heating medium from the heat accumulating device 34 to the thermal medium flow path 32 is blocked. The heating medium flowing out from an outlet 32b of the thermal medium flow path 32 is returned to the heat accumulating device 34. In FIG. 1B, a specific structure for supplying the heating medium from the heat accumulating device 34 to the inlet 32a of the thermal medium flow path 32 and a specific structure for returning the heating medium from the outlet 32b of the thermal medium flow path 32 to the heat accumulating device 34 are simplified, but these structures can be realized with known structures.

In addition, in the present embodiment, the thermal medium flow path 32 is partially formed, of the outer peripheral side of the radial plain bearing 30 in the bearing retaining unit 13 (an outer peripheral side of the halved metal 31A in the bearing retaining unit body 20 and an outer peripheral side of the halved metal 31B in the cap 21), only on the outer peripheral side of the halved bearing metal 31B in the cap 21, and is not formed on the outer peripheral side of the halved bearing metal 31A in the bearing retaining unit body 20. In other words, of the outer peripheral side of the radial plain bearing 30 in the bearing retaining unit 13 (the outer peripheral side of the halved bearing metal 31A in the bearing retaining unit body 20 and the outer peripheral side of the halved bearing metal 31B in the cap 21), the heating medium flowing through the thermal medium flow path 32 selectively supplies heat only on the outer peripheral side of the halved bearing metal 31B in the cap 21, and does not supply the heat on the outer peripheral side of the halved bearing metal 31A in the bearing retaining unit body 20. In the example configuration shown in FIGS. 1A and 1B, the inlet 32a of the thermal medium flow path 32 is formed on one end surface, in the rotational shaft direction, of the cap 21, the outlet 32b of the thermal medium flow path 32 is formed on the other end surface, in the rotational shaft direction, of the cap 21, and the thermal medium flow path 32 is formed in a serpentine manner in the circumferential direction of the shaft from the inlet 32a (one end surface in the rotational shaft direction) to the outlet 32b (the other end surface in the rotational shaft direction). Alternatively, the shape of the thermal medium flow path 32 may be other shapes. In addition, in the example structure shown in FIGS. 1A and 1B, the thermal medium flow path 32 is formed over most of the regions in relation to the outer periphery of the halved bearing metal 31B, but alternatively, the thermal medium flow path 32 may be locally formed in a part of the regions in relation to the outer periphery of the halved bearing metal 31B. Moreover, the thermal medium flow path 32 may alternatively be formed in a divided manner among a plurality of regions in relation to the outer periphery of the halved bearing metal 31B.

In the present embodiment, a thermal insulation layer 52 is provided on the outer peripheral side of the halved bearing metal 31A, more specifically, between the bearing retaining unit body 20 and the halved bearing metal 31A. In addition, a thermal insulation layer 53 is provided on the outer peripheral side of the thermal medium flow path 32, more specifically, on the outer peripheral surface of the cap 21. Moreover, the cap 21 is fastened to the bearing retaining unit body 20 via a thermal insulation layer 54, and the thermal insulation layer 54 is sandwiched between the bearing retaining unit body 20 and the cap 21. Furthermore, a thermal insulating member ring 56 is provided between the head 15C of the bolt 15 and the cap 21, and the head 15C of the bolt 15 is pressurized toward the cap 21 via the thermal insulating material ring 56. Examples of materials of the thermal insulation layers 52, 53, and 54 and the thermal insulating material ring 56 include ceramics such as zirconia and alumina, or alternatively, a PEEK (polyether ether ketone) resin may be used.

At the time of low-temperature, such as during starting of the internal combustion engine, because the viscosity of the lubricating oil is high, the viscous frictional loss when the crank journal 18 is rotated is high. In order to reduce the viscous frictional loss, it is desirable to quickly raise the temperature of the lubricating oil and to quickly reduce the viscosity of the lubricating oil. In the present embodiment, in consideration of this, when a warm-up operation is executed to raise the temperature of the lubricating oil and reduce the viscosity at the time of low-temperature such as when the internal combustion engine is started, the heating medium supply control valve 35 is opened to supply the heating medium in which heat is accumulated in the heat accumulating device 34 to the thermal medium flow path 32 formed on the outer peripheral side of the halved bearing metal 31B in the cap 21. In this process, the supply of the heating medium from the heat accumulating device 34 to the thermal medium flow path 32 can be started in advance before the cranking of the internal combustion engine, or alternatively, the supply of the heating medium from the heat accumulating device 34 to the thermal medium flow path 32 may be started at the time of cranking of the internal combustion engine. Utilizing the heat of the heating medium flowing through the thermal medium flow path 32 being supplied to the cap 21 and the halved bearing metal 31B, the cap 21 and the halved bearing metal 31B are heated and the temperature is raised. With this process, the lubricating oil supplied to the gap 100 between the radial plain bearing 30 and the crank journal 18 can be heated from the outer peripheral side and the viscosity of the lubricating oil can be reduced, and consequently, the viscous frictional loss during the rotation of the crank journal 18 can be reduced. After the warm-up of the internal combustion engine is completed, the heating medium supply control valve 35 is closed to stop the supply of the heating medium from the heat accumulating device 34 to the thermal medium flow path 32, and heat is accumulated in the heat accumulating device 34 using the heat of, for example, the exhaust gas of the internal combustion engine, the lubricating oil, or the like so that the heat is supplied to the heating medium in the heat accumulating device 34.

As described, in the present embodiment, when the warm-up operation is executed, on the outer peripheral side of the radial plain bearing 30 in the bearing retaining unit 13, heat is not supplied from the heating medium in the thermal medium flow path 32 on the outer peripheral side of the halved bearing metal 31A in the bearing retaining unit body 20 having a large thermal capacity, and the heat is selectively supplied from the heating medium in the thermal medium flow path 32 only on the outer peripheral side of the halved bearing metal 31B in the cap 21 having a small thermal capacity. With this configuration, it is possible to suppress diffusion of the heat supplied from the heating medium in the thermal medium flow path 32 to the bearing retaining unit body 20 having a large thermal capacity, the percentage of the amount of heat, of the heat supplied from the heating medium in the thermal medium flow path 32, used for raising the temperature of the lubricating oil supplied to the gap 100 between the radial plain bearing 30 and the crank journal 18 can be increased, and consequently, the temperature raising efficiency of the lubricating oil per unit amount of heat can be improved. Therefore, the heat of the heating medium supplied from the heat accumulating device 34 to the thermal medium flow path 32 can be efficiently used to efficiently raise the temperature of the lubricating oil supplied to the gap 100 between the radial plain bearing 30 and the crank journal 18 and to efficiently reduce the viscosity. As a result, the viscous frictional loss when the crank journal 18 is rotated can be quickly reduced.

Figure 2:
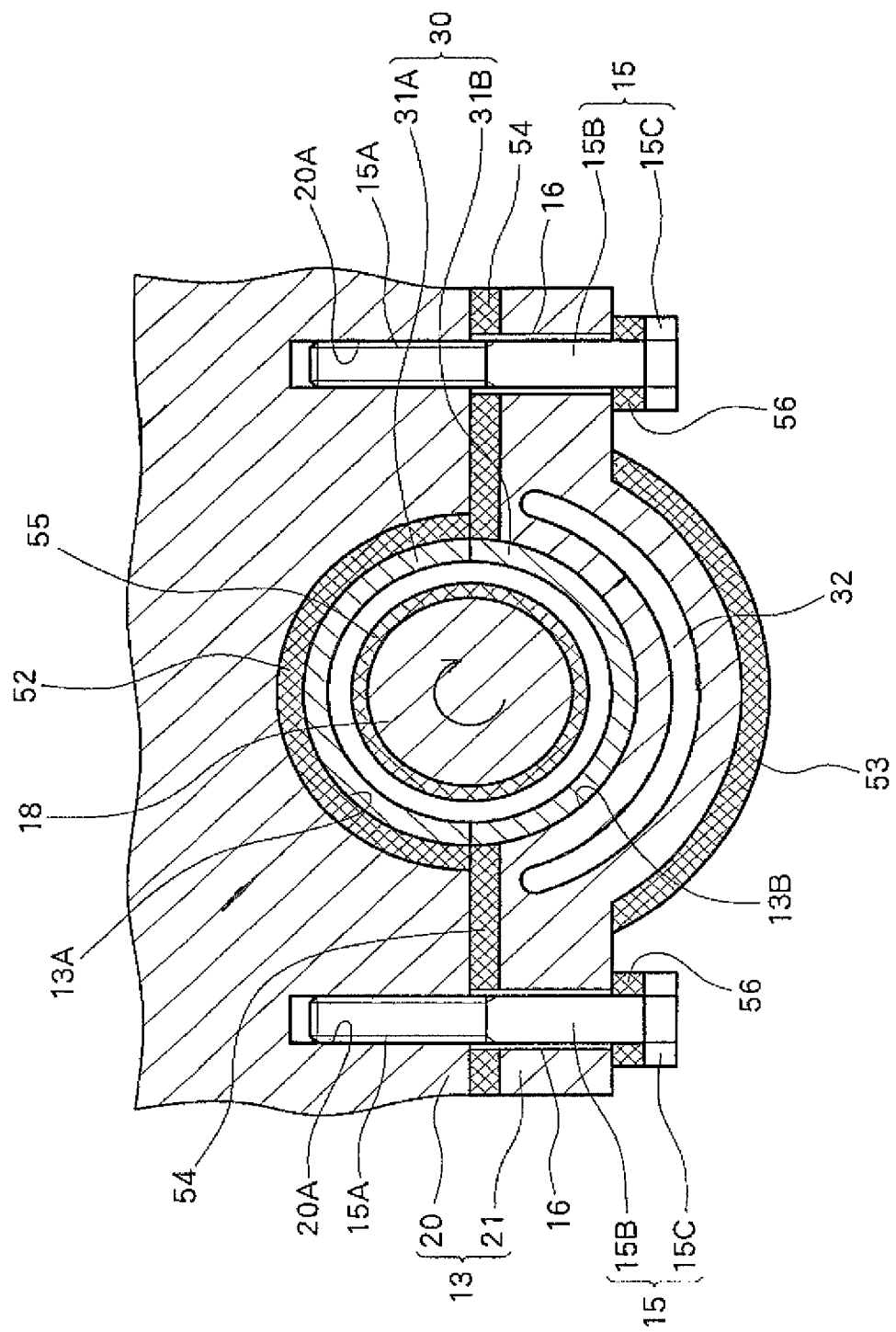
FIG. 2 is a diagram schematically showing another configuration of the bearing structure for an internal combustion engine according to the preferred embodiment of the present invention.

Moreover, in the present embodiment, diffusion of heat from the cap 21 having a small thermal capacity to the bearing retaining unit body 20 having a large thermal capacity can be suppressed by the thermal insulation layer 54, and the temperature raising efficiency of the lubricating oil and the cap 21 can be further improved. Moreover, the temperature raising efficiency of the lubricating oil and the cap 21 can be further improved by suppressing, with the thermal insulating material ring 56, diffusion of heat from the cap 21 via the bolt 15 to the bearing retaining unit body 20. In addition, diffusion of heat from the lubricating oil in the gap 100 between the radial plain bearing 30 and the crank journal 18 to the bearing retaining unit body 20 can be suppressed by the thermal insulation layer 52, and the temperature raising efficiency of the lubricating oil and the cap 21 can be further improved. Moreover, discharge of heat from the heating medium in the thermal medium flow path 32 to the outside of the cap 21 can be suppressed by the thermal insulation layer 53, and the temperature raising efficiency of the lubricating oil and the cap 21 can be further improved. In addition, in the present embodiment, for example, as shown in FIG. 2, a thermal insulation layer 55 can be provided on the outer peripheral surface of the crank journal 18, and with this configuration, diffusion of heat of the lubricating oil generated by viscous shear to the crank shaft having a large thermal capacity (volume) can be suppressed by the thermal insulation layer 55, and the temperature raising efficiency of the lubricating oil and the cap 21 can be further improved.

Alternatively, in the present embodiment, a heat exchanger may be provided in place of the heat accumulating device 34. In this case, heat may be exchanged in the heat exchanger between, for example, the exhaust gas of the internal combustion engine and the heating medium, during the driving of the internal combustion engine, to supply heat to the heating medium.

In addition, in the present embodiment, a cooling medium may be supplied to the thermal medium flow path 32 in place of the heating medium. In this case, a cooling medium supply control valve can be provided on the side of the inlet 32a of the thermal medium flow path 32, the cooling medium supply control valve can be opened to enable supply of the cooling medium to the thermal medium flow path 32, the cooling medium supply control valve can be closed to block the supply of the cooling medium into the thermal medium flow path 32, and the supply state of the cooling medium into the thermal medium flow path 32 can be controlled. As the cooling medium employed here, for example, cooling water of the internal combustion engine, oil which has exchanged heat with the cooling water, or the like may be used. At the time of high-temperature when the viscosity of the lubricating oil is low such as after the warm-up of the internal combustion engine, the heating medium supply control valve 35 is closed and the cooling medium supply control valve is opened, to supply the cooling medium into the thermal medium flow path 32 in place of the heating medium. With the cooling medium flowing through the thermal medium flow path 32 in place of the heating medium, the thermal medium flow path 32 functions as a cooling device, the cap 21 and the halved bearing metal 31B are cooled by the cooling medium flowing through the thermal medium flow path 32, and the sliding portion of the crank journal 18 and the radial plain bearing 30 is cooled. With this process, at the time of high-temperature such as after the warm-up of the internal combustion engine, the temperature of the sliding portion of the crank journal 18 and the radial plain bearing 30 can be reduced, and depletion of oil in the oil film and seizure due to the high temperature can be prevented.

Figure 3:
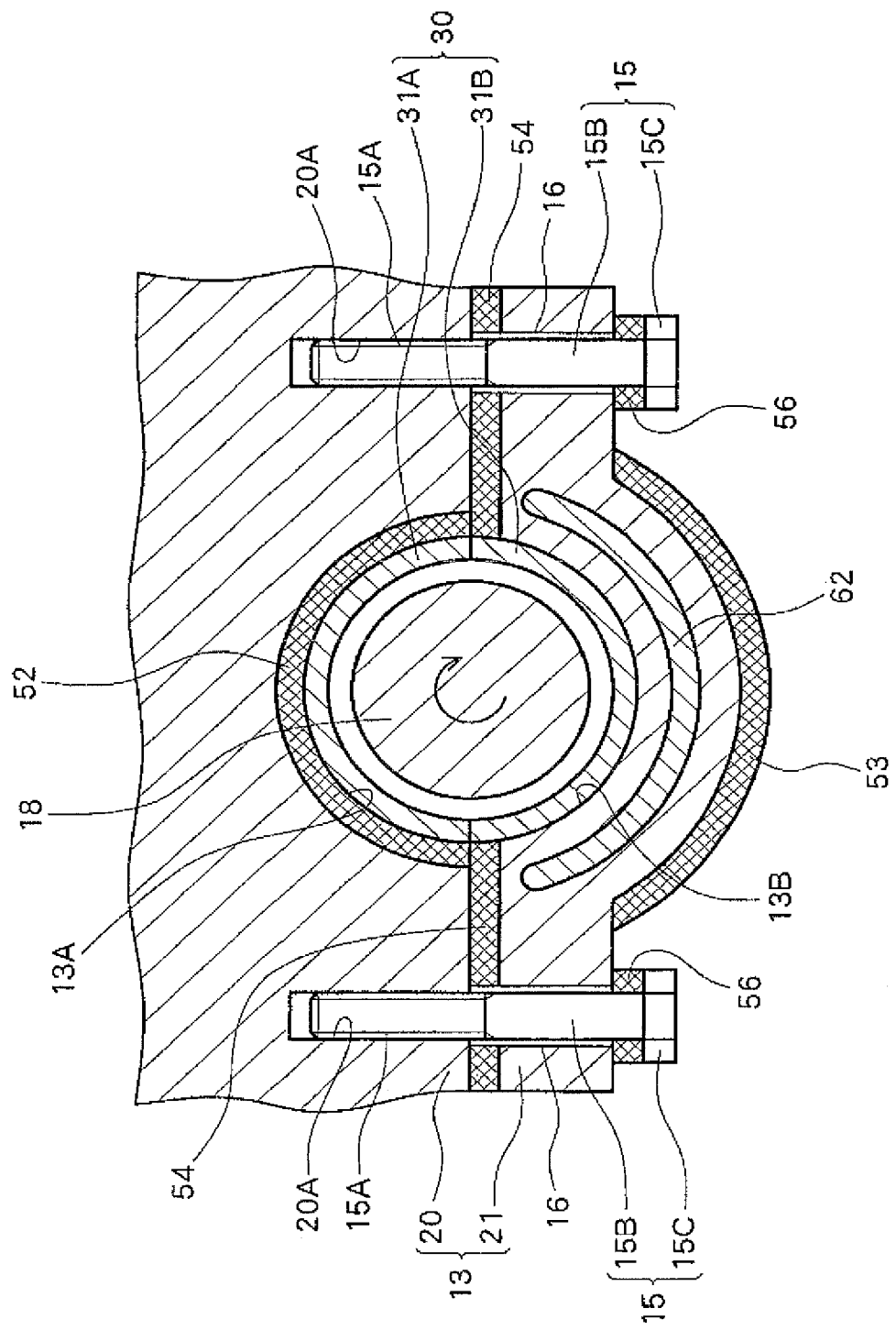
FIG. 3 is a diagram schematically showing another configuration of the bearing structure for an internal combustion engine according to the preferred embodiment of the present invention.
Figure 4:
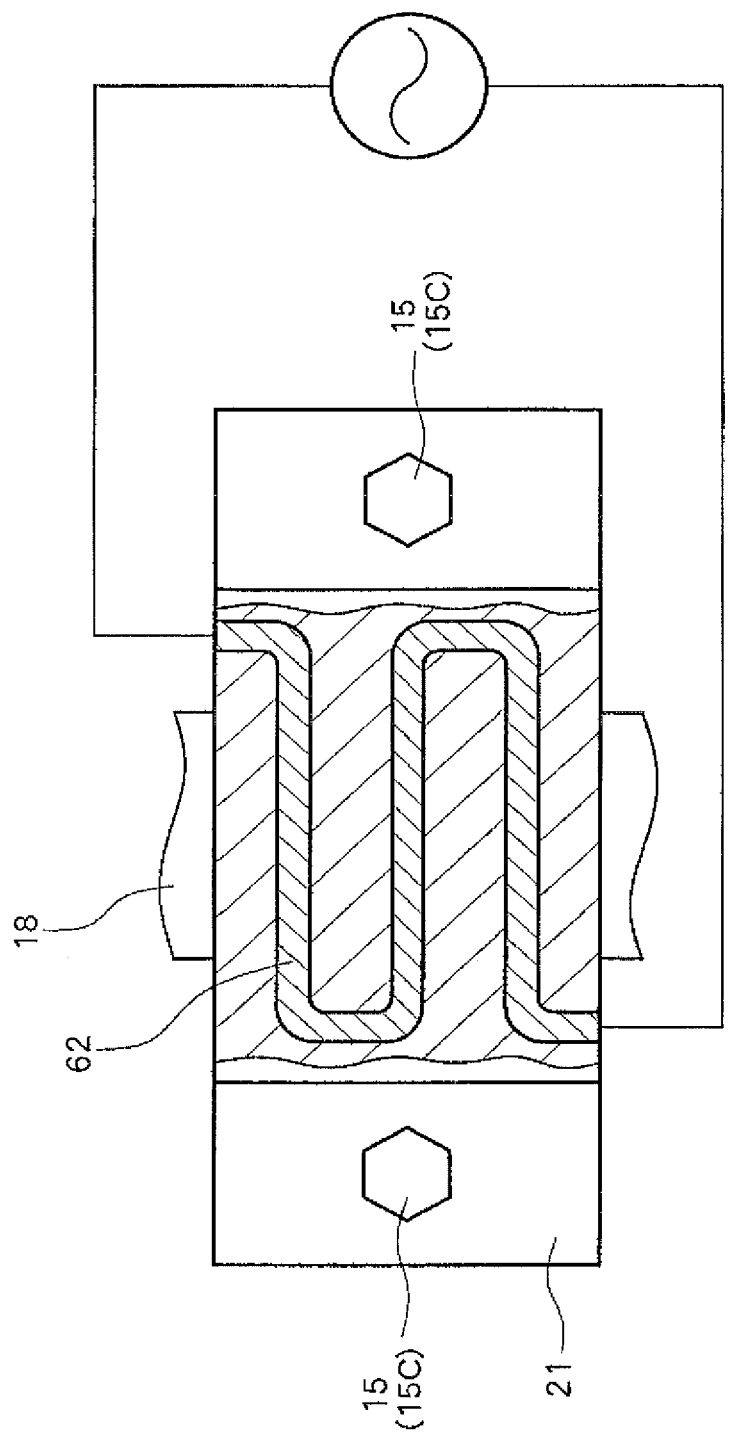
FIG. 4 is a diagram schematically showing another configuration of the bearing structure for an internal combustion engine according to the preferred embodiment of the present invention.

FIGS. 3 and 4 show another example configuration of the bearing structure for the internal combustion engine according to the present embodiment. FIG. 3 is a cross-sectional diagram of the bearing structure viewed from the rotational shaft direction, and FIG. 4 is an internal structural diagram of the bearing structure viewed from a direction perpendicular to the rotational shaft direction. In the example configuration of FIGS. 3 and 4, a heater 62 is provided as the heat supplying device in place of the thermal medium flow path 32. The heater 62 in this configuration also is partially provided, on the outer peripheral side of the radial plain bearing 30 in the bearing retaining unit 13 (the outer peripheral side of the halved bearing metal 31A in the bearing retaining unit body 20 and the outer peripheral side of the halved bearing metal 31B in the cap 21), only on the outer peripheral side of the halved bearing metal 31B in the cap 21, and is not provided on the outer peripheral side of the halved bearing metal 31A in the bearing retaining unit body 20. In the example configuration shown in FIGS. 3 and 4, one end of the heater 62 is placed on one end surface, in the rotational shaft direction, of the cap 21, the other end of the heater 62 is placed on the other end surface, in the rotational shaft direction, of the cap 21, and the heater 62 is formed in a serpentine manner from the one end to the other end in the circumferential direction of the bearing. Alternatively, the shape of the heater 62 may be another shape. In addition, in the example configuration shown in FIGS. 3 and 4, the heater 62 is provided over most of the regions in relation to the outer periphery of the halved bearing metal 31B, but alternatively, the heater 62 may be locally provided at some of the regions in relation to the outer periphery of the halved bearing metal 31B. Moreover, the heater 62 may be provided in a divided manner in a plurality of regions in relation to the outer periphery of the halved bearing metal 31B.

In the example configuration of FIGS. 3 and 4 also, when a warm-up operation is executed to raise the temperature of the lubricating oil and reduce the viscosity at the time of low-temperature such as when the internal combustion engine is started, electricity may be applied to the heater 62 for heating, so that of the outer peripheral side of the halved bearing metal 31A in the bearing retaining unit body 20 and the outer peripheral side of the halved bearing metal 31B in the cap 21, heat is not supplied from the heater 62 on the outer peripheral side of the halved bearing metal 31A in the bearing retaining unit body 20 having a large thermal capacity and the heat is selectively supplied from the heater 62 only on the outer peripheral side of the halved bearing metal 31B in the cap 21 having a small thermal capacity. With this configuration, diffusion of heat supplied from the heater 62 to the bearing retaining unit body 20 having a large thermal capacity can be suppressed, the percentage of the amount of heat, of the heat supplied from the heater 62, used for raising the temperature of the lubricating oil supplied to the gap between the radial plain bearing 30 and the crank journal 18 can be increased, and therefore, the temperature of the lubricating oil can be efficiently raised and the viscosity can be efficiently reduced.

Figure 5:
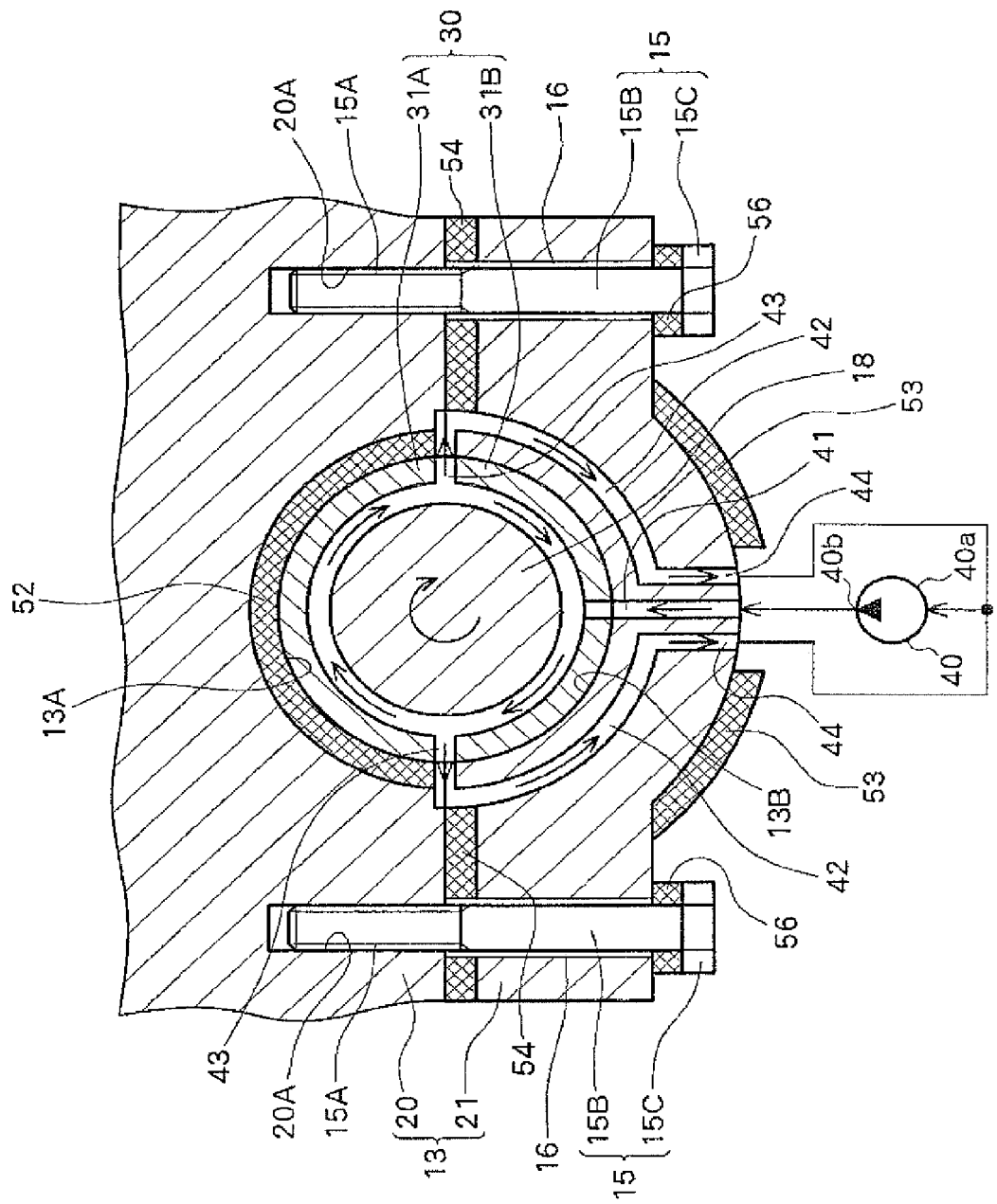
FIG. 5 is a diagram schematically showing another configuration of the bearing structure for an internal combustion engine according to the preferred embodiment of the present invention.
Figure 6:
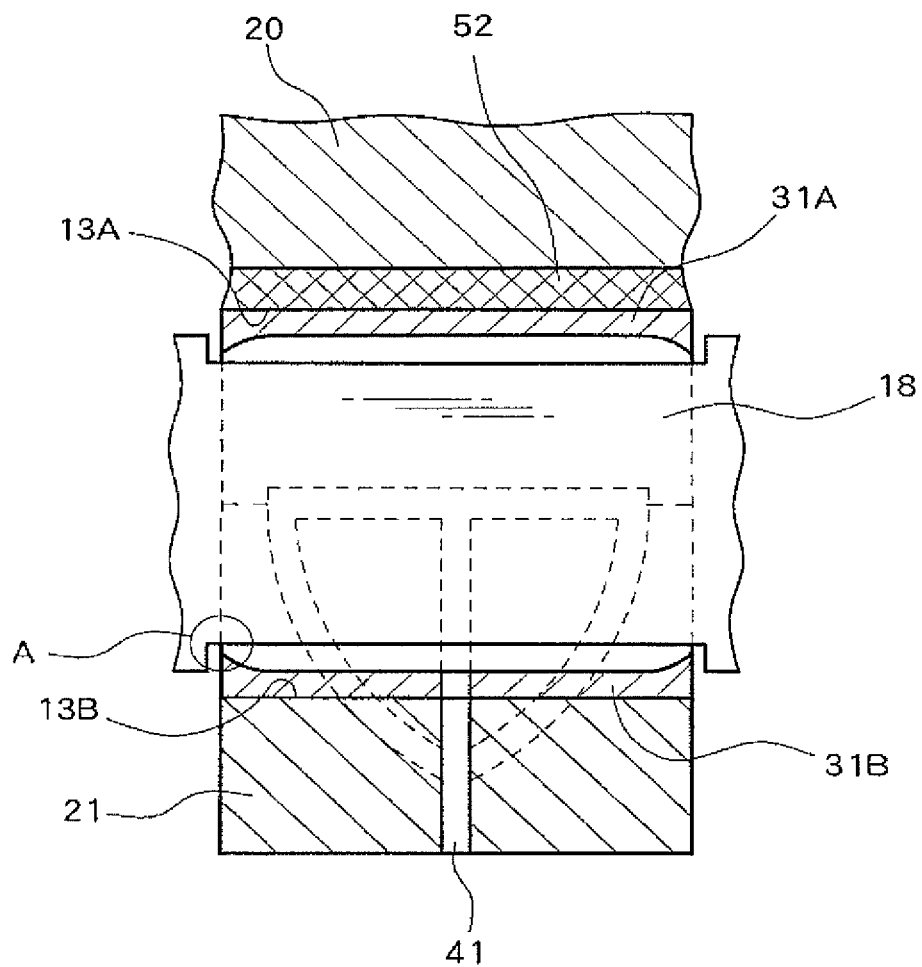
FIG. 6 is a diagram schematically showing another configuration of the bearing structure for an internal combustion engine according to the preferred embodiment of the present invention.
Figure 7:
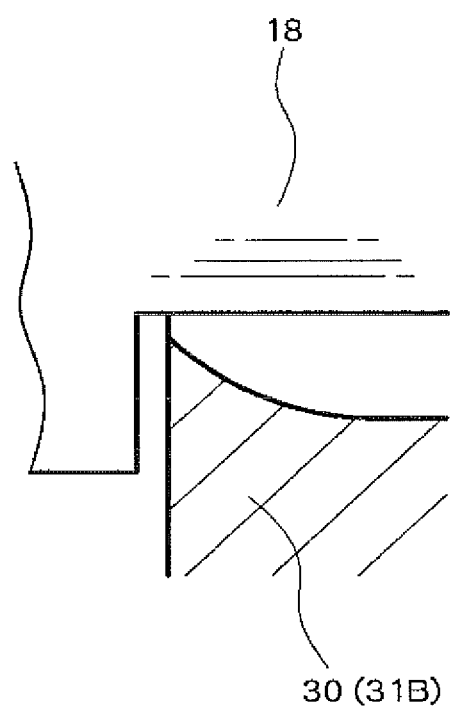
FIG. 7 is a diagram schematically showing another configuration of the bearing structure for an internal combustion engine according to the preferred embodiment of the present invention.
Figure 8:
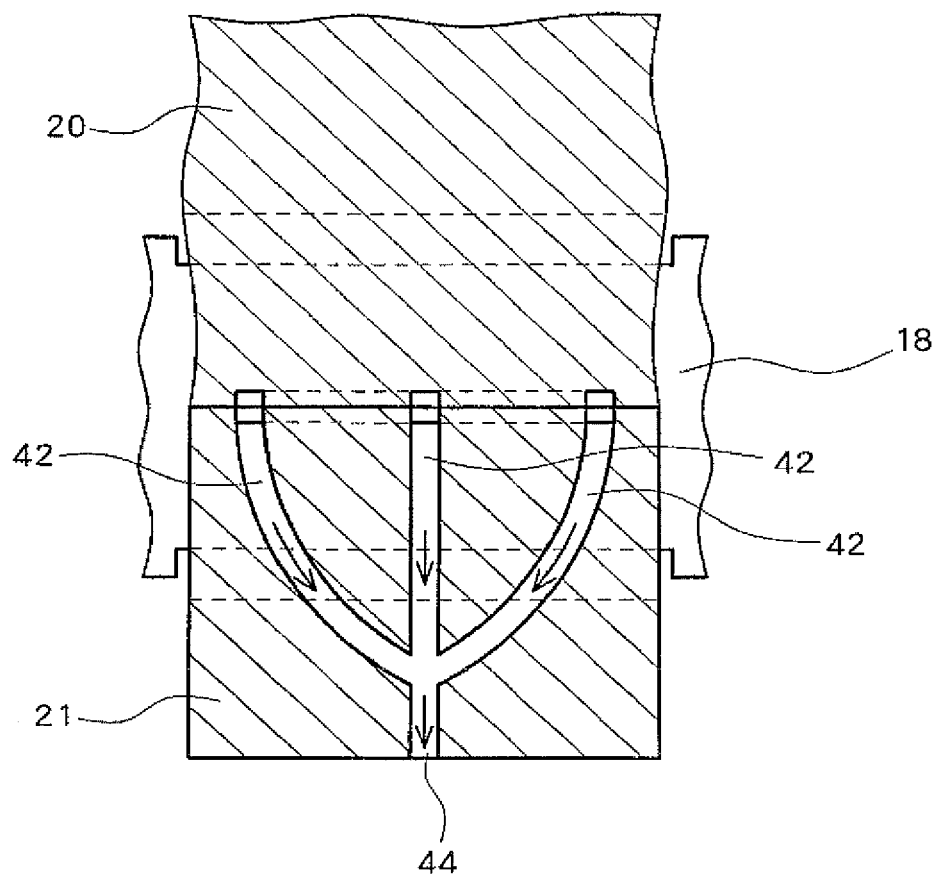
FIG. 8 is a diagram schematically showing another configuration of the bearing structure for an internal combustion engine according to the preferred embodiment of the present invention.

FIGS. 5-8 show another example configuration of the bearing structure for an internal combustion engine according to the present embodiment. FIG. 5 is a cross-sectional diagram viewed from the rotational shaft direction of the bearing structure, FIGS. 6 and 8 are internal structural diagrams viewed from a direction perpendicular to the rotational shaft direction of the bearing structure, and FIG. 7 is an enlarged view of an A section of FIG. 6. In the example configuration of FIGS. 5-8, a lubricating oil supply path 41 which is in communication with the gap between the radial plain bearing 30 and the crank journal 18 and for supplying the lubricating oil to the gap between the radial plain bearing 30 and the crank journal 18 is formed on the cap 21 and the halved bearing metal 31B. The lubricating oil discharged from an outlet 40b of an oil pump 40 is supplied to the lubricating oil supply path 41.

As shown in FIGS. 6 and 7, at inner peripheral surfaces of the radial plain bearing 30 (the halved bearing metals 31A and 31B), the ends are extended toward an inner side in the radial direction (a side of the crank journal 18) more than the other portions in relation to the rotational shaft direction (crank shaft axis direction). With this configuration, the gap between the inner peripheral surface of the radial plain bearing 30 and the outer peripheral surface of the crank journal 18 is narrower at both ends than the other portions in relation to the rotational shaft direction. In addition, in the crank shaft (crank journal 18), a diameter of a portion positioned on an inner peripheral side of the radial plain bearing 30 is smaller than a diameter of portions positioned on both sides in the rotational shaft direction, and a stepped shape is formed. Moreover, a lubricating oil flow-out port 43 which is in communication with the gap between the radial plain bearing 30 and the crank journal 18 and for discharging the lubricating oil from the gap between the radial plain bearing 30 and the crank journal 18 is formed on the radial plain bearing 30. In the example configuration of FIGS. 5-8, a clearance is formed by, for example, a cutout or a recess, between the matching surfaces (both end surfaces in the circumferential direction of the bearing) of the halved bearing metals 31A and 31B, to form the lubricating oil flow-out port 43 (in both ends in the rotational shaft direction, the clearance is not formed or is formed narrow in order to prevent leakage of the lubricating oil to the outside), and the lubricating oil flow-out port 43 is placed in a shifted manner (in the example configuration of FIGS. 5-8, by 90°) from the lubricating oil supply path 41 in relation to the circumferential direction of the bearing. Alternatively, the lubricating oil flow-out port 43 may be formed on the halved bearing metal 31B.

On an outer periphery of the halved bearing metal 31B in the cap 21, a plurality of heat exchange oil paths 42 in communication with the lubricating oil flow-out port 43 are formed, and the lubricating oil passing through each heat exchange oil path 42 exchanges heat with the cap 21. In addition, on the cap 21, a lubricating oil discharge path 44 in communication with each heat exchange oil path 42 is formed and is placed close to the lubricating oil supply path 41 so that heat is exchanged between the lubricating oil passing through the lubricating oil discharge path 44 and the lubricating oil passing through the lubricating oil supply path 41. One end of each of the plurality of heat exchange oil paths 42 is in communication with the lubricating oil flow-out port 43 in a state of being spaced from each other in the rotational shaft direction, and the other end of each of the heat exchange oil paths 42 is in communication with the lubricating oil discharge path 44. In FIGS. 5-8, sizes such as widths of the lubricating oil supply path 41, the heat exchange oil path 42, the lubricating oil flow-out port 43, and the lubricating oil discharge path 44 are shown larger than the actual sizes for purposes of explanation. The other structures are similar to those of the example configuration shown in FIGS. 1A and 1B.

The lubricating oil supplied from the oil pump 40 to the lubricating oil supply path 41 flows into the gap between the inner peripheral surface of the radial plain bearing 30 and the outer peripheral surface of the crank journal 18, as shown by an arrow in FIG. 5. The lubricating oil flows through the gap between the radial plain bearing 30 and the crank journal 18 in the circumferential direction of the bearing (rotational direction of the crank journal 18), and flows out from the lubricating oil flow-out port 43. In this process, because both ends are narrower than the other portions in relation to the rotational shaft direction in the gap between the radial plain bearing 30 and the crank journal 18, flowing out of the lubricating oil from both end surfaces in the rotational shaft direction of the bearing retaining unit 13 can be suppressed. Furthermore, when the crank shaft (crank journal 18) is formed in the stepped-shaped, as described above, the flowing out of the lubricating oil from both end surfaces in the rotational shaft direction of the bearing retaining unit 13 can be suppressed.

The lubricating oil flowing out from the lubricating oil flow-out port 43 flows through each heat exchange oil path 42 as shown by arrows in FIGS. 5 and 8, to exchange heat with the cap 21. The lubricating oil flowing out from each heat exchange oil path 42 flows through the lubricating oil discharge path 44, to exchange heat with the lubricating oil flowing through the lubricating oil supply path 41. The lubricating oil flowing out from the lubricating oil discharge path 44 to the outside of the cap 21 is returned to the side of the inlet 40a of the oil pump 40. In FIG. 5, a specific structure for supplying the lubricating oil from the outlet 40b of the oil pump 40 to the lubricating oil supply path 41 and a specific structure for returning the lubricating oil from the lubricating oil discharge path 44 to the inlet 40a of the oil pump 40 are simplified, but these structures can be realized with known structures.

When the crank journal 18 rotates with respect to the radial plain bearing 30, heat is generated in the lubricating oil supplied to the gap between the radial plain bearing 30 and the crank journal 18 by a viscous shearing force (sliding friction), and the amount of generation of heat by the shearing force is increased as the temperature of the lubricating oil is reduced and the viscosity is increased. In the example configuration of FIGS. 5-8, at the time of low-temperature when the viscosity of the lubricating oil is high such as immediately after starting of the internal combustion engine, the lubricating oil in which heat is generated by the viscous shear between the crank journal 18 and the radial plain bearing 30 is supplied to each heat exchange oil path 42 via the lubricating oil flow-out port 43. In this process, as described above, flowing out of the lubricating oil in which the heat is generated by the viscous shear from both end surfaces in the rotational shaft direction of the bearing retaining unit 13 is suppressed. The lubricating oil in which heat is generated and that passes through each heat exchange oil path 42 exchanges heat with the cap 21 (outer periphery of the halved bearing metal 31B), to heat the cap 21. With this configuration, the lubricating oil supplied to the gap between the radial plain bearing 30 and the crank journal 18 can be heated from the outer peripheral side and the viscosity of the lubricating oil can be reduced. Because of this, the viscous frictional loss when the crank journal 18 rotates can be reduced. In this process, a number and a length of the heat exchange oil paths 42 formed inside the cap 21 may be increased to increase a contact area between the lubricating oil passing through the heat exchange oil path 42 and the bearing retaining unit 13, so that the amount of supplied heat from the lubricating oil in which heat is generated and passing through the heat exchange oil path 42 to the cap 21 can be increased. In addition, the lubricating oil passing through the lubricating oil supply path 41 can be heated by the lubricating oil in which heat is generated and that passes through the lubricating oil discharge path 44 exchanging heat with the lubricating oil passing through the lubricating oil supply path 41. With this process also, the lubricating oil supplied to the gap between the radial plain bearing 30 and the crank journal 18 can be heated and the viscosity of the lubricating oil can be reduced.

As described, in the example configuration shown in FIGS. 5-8, at the time of low-temperature when the viscosity of the lubricating oil is high, such as immediately after starting of the internal combustion engine, the lubricating oil in which heat is generated by the viscous shear between the crank journal 18 and the radial plain bearing 30 is supplied to the heat exchange oil path 42 inside the cap 21, and the heat of the lubricating oil passing through the heat exchange oil path 42 is supplied to the cap 21 for warm-up, using the heat exchange inside the cap 21 between the lubricating oil in which heat is generated and passing through the heat exchange oil path 42 and the cap 21. With this process, while discharge of the heat of the lubricating oil in which the heat is generated by the viscous shear to the outside of the bearing retaining unit 13 is suppressed, the heat of the lubricating oil generated by the viscous shear is effectively used to quickly raise the temperature of and quickly reduce the viscosity of the lubricating oil supplied to the gap between the radial plain bearing 30 and the crank journal 18. In this process, because the discharge of the lubricating oil in which the heat is generated by the viscous shear from both end surfaces in the rotational shaft direction of the bearing retaining unit 13 is also suppressed, escaping of the heat generated by the viscous shear to the outside of the bearing retaining unit 13 is suppressed. Moreover, with the use of the heat exchange between the lubricating oil in which the heat is generated and that passes through the lubricating oil discharge path 44 and the lubricating oil passing through the lubricating oil supply path 41 also, the temperature of the lubricating oil supplied to the gap between the radial plain bearing 30 and the crank journal 18 can be efficiently raised.

Moreover, in the example configuration shown in FIGS. 5-8 also, the heat exchange oil path 42 is partially formed, of the outer peripheral side of the halved bearing metal 31A in the bearing retaining unit body 20 and the outer peripheral side of the halved bearing metal 31B in the cap 21, only on the outer peripheral side of the halved bearing metal 31B in the cap 21, and is not formed on the outer peripheral side of the halved bearing metal 31A in the bearing retaining unit body 20. Because of this, at the time of low-temperature, such as immediately after the starting of the internal combustion engine or the like, of the outer peripheral side of the halved bearing metal 31A in the bearing retaining unit body 20 and the outer peripheral side of the halved bearing metal 31B in the cap 21, the heat is not supplied from the lubricating oil in the heat exchange oil path 42 in which the heat is generated on the outer peripheral side of the halved bearing metal 31A in the bearing retaining unit body 20 having a large thermal capacity, and the heat is selectively supplied from the lubricating oil in the heat exchange oil path 42 in which the heat is generated only on the outer peripheral side of the halved bearing metal 31B in the cap 21 having a small thermal capacity. With this configuration, diffusion of the heat supplied from the lubricating oil in the heat exchange oil path 42 in which the heat is generated to the bearing retaining unit body 20 having a large thermal capacity can be suppressed, and the percentage of the amount of heat, of the heat supplied from the lubricating oil in the heat exchange oil path 42 in which the heat is generated, used for raising the temperature of the lubricating oil supplied to the gap between the radial plain bearing 30 and the crank journal 18 can be increased. Consequently, the temperature of the lubricating oil can be efficiently raised and the viscosity can be efficiently reduced.

In addition, in the example configuration shown in FIGS. 5-8, an oil preheating device can be provided on the side of the outlet 40b of the oil pump 40. The oil preheating device may be operated at the time of low-temperature when the viscosity of the lubricating oil is high, such as immediately after the starting of the internal combustion engine, so that the lubricating oil discharged from the outlet 40b of the oil pump 40 is preheated (heated) by the oil preheating device and then supplied to the lubricating oil supply path 41. With this configuration, the temperature of the lubricating oil supplied to the gap between the radial plain bearing 30 and the crank journal 18 can be more quickly raised and the viscosity can be more quickly reduced.

Moreover, in the example configuration shown in FIGS. 5-8, an oil cooling device can be provided on the side of the outlet 40b of the oil pump 40. The oil cooling device may be operated at the time of high-temperature when the viscosity of the lubricating oil is low, such as after warm-up of the internal combustion engine, so that the lubricating oil discharged from the outlet 40b of the oil pump 40 is cooled by the oil cooling device and then supplied to the lubricating oil supply path 41. With this configuration, the sliding portion of the crank journal 18 and the radial plain bearing 30 can be cooled.

Figure 9:
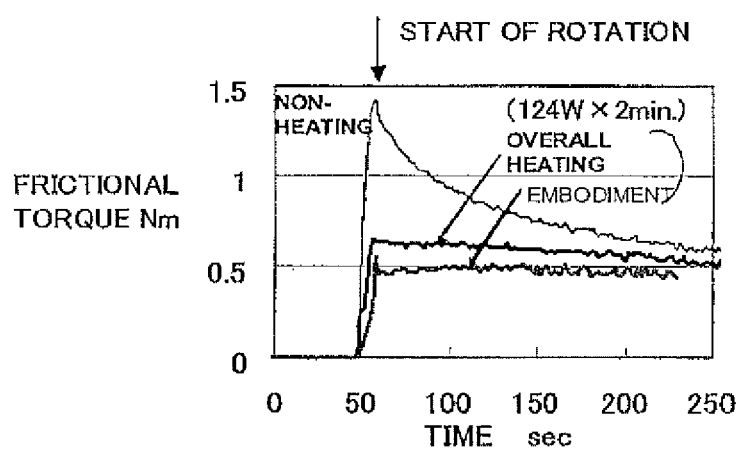
FIG. 9 is a diagram showing an experimental result confirming a reduction effect of frictional loss in the bearing structure for an internal combustion engine according to the preferred embodiment of the present invention.
Figure 10:
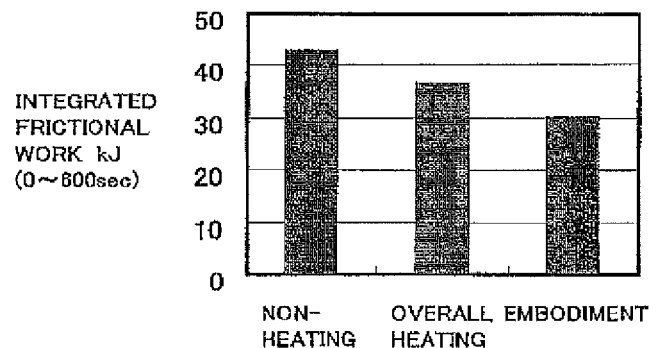
FIG. 10 is a diagram showing an experimental result confirming a reduction effect of frictional loss in the bearing structure for an internal combustion engine according to the preferred embodiment of the present invention.
Figure 11:
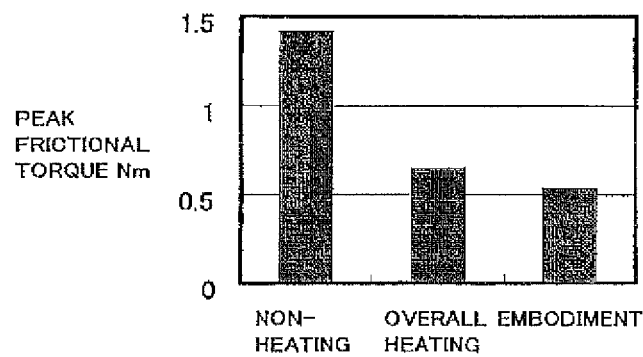
FIG. 11 is a diagram showing an experimental result confirming a reduction effect of frictional loss in the bearing structure for an internal combustion engine according to the preferred embodiment of the present invention.
Figure 12:
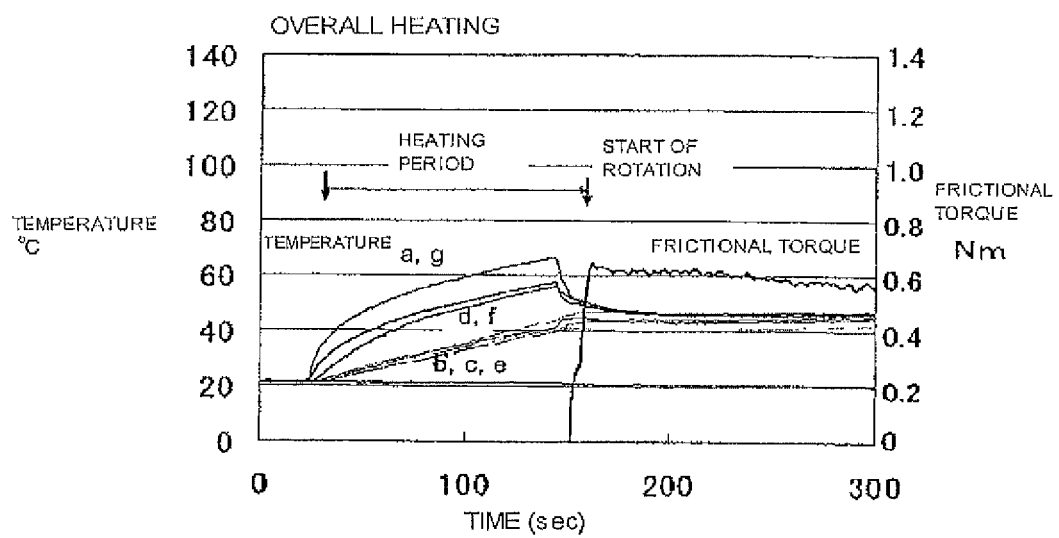
FIG. 12 is a diagram showing an experimental result confirming a reduction effect of frictional loss in the bearing structure for an internal combustion engine according to the preferred embodiment of the present invention.
Figure 13:
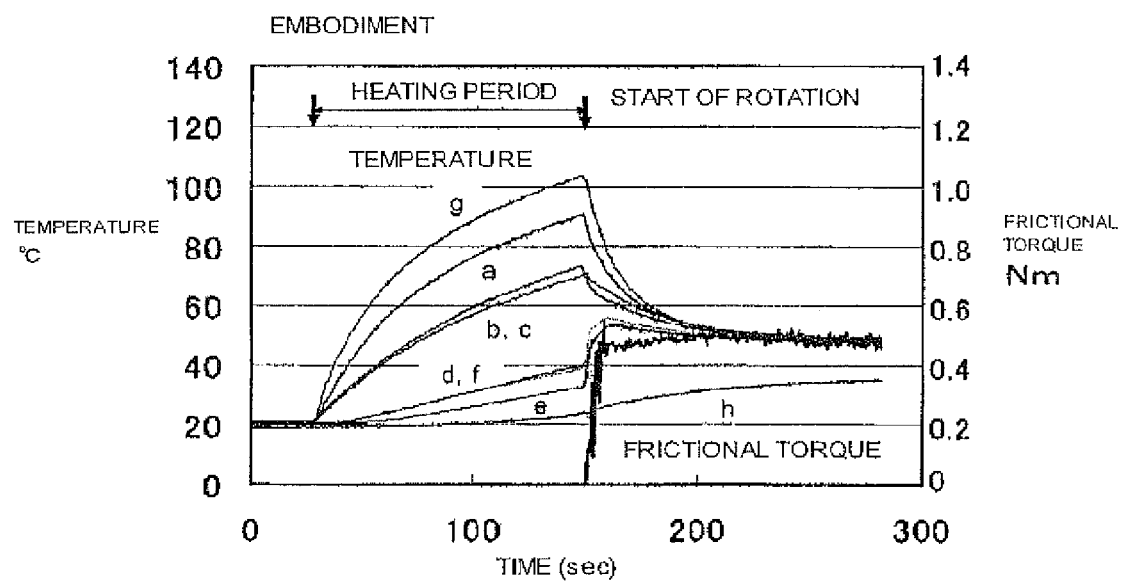
FIG. 13 is a diagram showing an experimental result confirming a reduction effect of frictional loss in the bearing structure for an internal combustion engine according to the preferred embodiment of the present invention.
Figure 14:
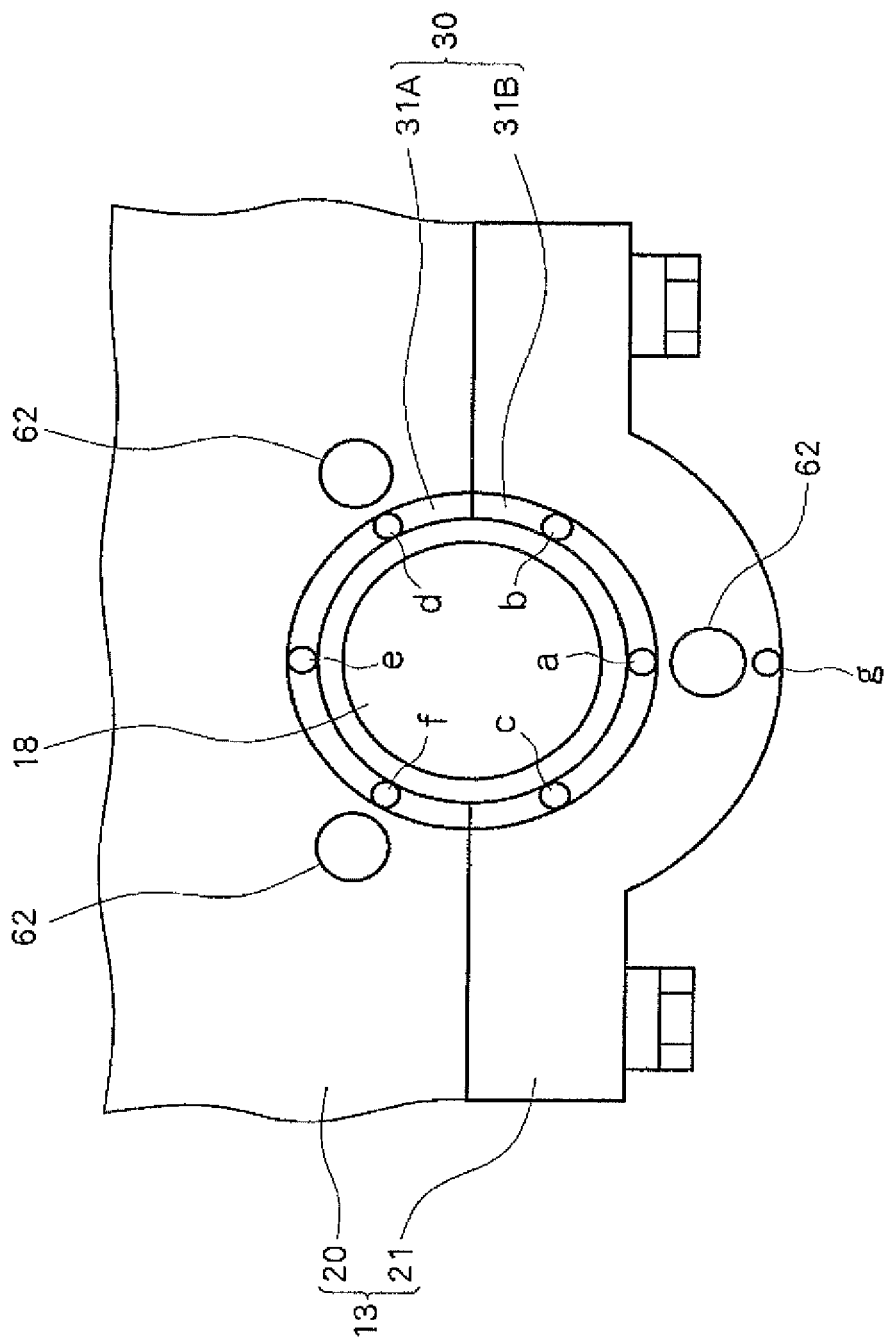
FIG. 14 is a diagram showing an example configuration for uniformly supplying heat from a heater on an outer peripheral side of a radial plain bearing.

FIGS. 9-13 show experimental results confirming a reduction effect of the frictional loss in the bearing structure for the internal combustion engine according to the present embodiment. FIG. 9 shows a change with respect to time of friction torque when the crank journal 18 rotates, FIG. 10 shows integrated frictional work (0-600 seconds) when the crank journal 18 rotates, and FIG. 11 shows peak friction torque when the crank journal 18 rotates. In FIGS. 9-11, the "overall heating" represents a specification in which, as shown in FIG. 14, the heat is uniformly supplied from the heater 62 on both the outer peripheral side of the halved bearing metal 31A in the bearing retaining unit body 20 and the outer peripheral side of the halved bearing metal 31B in the cap 21 (refer to FIG. 14 for placement position of the heater 62). The "embodiment" represents a specification in which, as shown in FIG. 15, of the outer peripheral side of the halved bearing metal 31A in the bearing retaining unit body 20 and the outer peripheral side of the halved bearing metal 31B in the cap 21, the heat is not supplied from the heater 62 on the outer peripheral side of the halved bearing metal 31A in the bearing retaining unit body 20 and the heat is selectively supplied from the heater 62 only on the outer peripheral side of the halved bearing metal 31B in the cap 21 (refer to FIG. 15 for the placement position of the heater 62). In the specification of the "embodiment", as shown in FIG. 15, the thermal insulation layers 52 and 54 made of a PEEK resin are provided. In addition, the "non-heating" represents a specification in which no heat is supplied from the heater 62. FIG. 12 shows changes with respect to time of temperature (refer to FIG. 14 for temperature measuring positions a-g) and of the frictional torque in the specification of "overall heating", and FIG. 13 shows changes with respect to time of the temperature (refer to FIG. 15 for temperature measurement positions a-h) and the friction torque in the specification of the "embodiment". In the specifications of "overall heating" and "embodiment", heat with an amount of 124 W×120 seconds is supplied from the heater 62 for heating, prior to the starting of the internal combustion engine (prior to starting of rotation). As shown in FIGS. 9-13, it can be understood that, in the specification of the "embodiment", compared to the specification of the "overall heating", the friction torque and the integrated frictional work can be reduced in conditions where the amount of supplied heat of the heater 62 is equal.

In the above description, as the bearing structure for the internal combustion engine according to the preferred embodiment of the present invention, a bearing structure for the crank journal 18 of the crank shaft has been exemplified. However, the bearing structure for the internal combustion engine according to the present invention can alternatively be applied to bearing structures of other rotational shafts of the internal combustion engine other than the bearing structure for the crank journal 18 of the crank shaft, such as, for example, a bearing structure for a camshaft of the internal combustion engine.

A preferred embodiment of the present invention has been described. The present invention, however, is not limited to the preferred embodiment, and the present invention can be practiced in various forms within the scope and spirit of the present invention.

EXPLANATION OF REFERENCE NUMERALS

13 BEARING RETAINING UNIT; 13A, 13B BEARING MOUNTING SURFACE; 15 BOLT; 18 CRANK JOURNAL; 20 BEARING RETAINING UNIT BODY; 21 CAP; 30 RADIAL PLAIN BEARING; 31A, 31B HALVED BEARING METAL; 32 THERMAL MEDIUM FLOW PATH; 34 HEAT ACCUMULATING DEVICE; 35 HEATING MEDIUM SUPPLY CONTROL VALVE; 40 OIL PUMP; 41 LUBRICATING OIL SUPPLY PATH; 42 HEAT EXCHANGE OIL PATH; 43 LUBRICATING OIL FLOW-OUT PORT; 44 LUBRICATING OIL DISCHARGE PATH; 52, 53, 54, 55 THERMAL INSULATION LAYER; 56 THERMAL INSULATING MATERIAL RING; 62 HEATER

The invention claimed is:

1. A bearing structure for an internal combustion engine in which a rotational shaft of an internal combustion engine is supported by a radial plain bearing via lubricating oil and the radial plain bearing is retained by a bearing retaining unit, the bearing structure comprising:
   a heat supplying device which supplies heat on an outer peripheral side of the radial plain bearing in the bearing retaining unit, wherein:
   the bearing retaining unit comprises a bearing retaining unit body and a cap which is fastened to the bearing retaining unit body and which has a smaller thermal capacity than the bearing retaining unit body,
   the radial plain bearing comprises a first halved bearing retained on the bearing retaining unit body and a second halved bearing retained on the cap,
   of an outer peripheral side of the first halved bearing in the bearing retaining unit body and an outer peripheral side of the second halved bearing in the cap, the heat supplying device supplies heat on the outer peripheral side of the second halved bearing in the cap and does not supply heat on the outer peripheral side of the first halved bearing in the bearing retaining unit body, the heat supplying device supplies heat of the lubricating oil flowing through a heat exchange oil path to which the lubricating oil is supplied from a gap between the radial plain bearing and the rotational shaft, and of the outer peripheral side of the first halved bearing in the bearing retaining unit body and the outer peripheral side of the second halved bearing in the cap, the heat exchange oil path is formed on the outer peripheral side of the second halved bearing in the cap and is not formed on the outer peripheral side of the first halved bearing in the bearing retaining unit body.

2. The bearing structure for the internal combustion engine according to claim 1, wherein in a rotational shaft direction, at least one end between the radial plain bearing and the rotational shaft is narrower than a central portion of the gap between the radial plain bearing and the rotational shaft.

3. A bearing structure for an internal combustion engine in which a rotational shaft of an internal combustion engine is supported by a radial plain bearing via lubricating oil and the radial plain bearing is retained by a bearing retaining unit, the bearing structure comprising:

a heat supplying device which supplies heat on an outer peripheral side of the radial plain bearing in the bearing retaining unit, wherein:

the bearing retaining unit comprises a bearing retaining unit body and a cap which is fastened to the bearing retaining unit body and which has a smaller thermal capacity than the bearing retaining unit body, the radial plain bearing comprises a first halved bearing retained on the bearing retaining unit body and a second halved bearing retained on the cap, of an outer peripheral side of the first halved bearing in the bearing retaining unit body and an outer peripheral side of the second halved bearing in the cap, the heat supplying device supplies heat on the outer peripheral side of the second halved bearing in the cap and does not supply heat on the outer peripheral side of the first halved bearing in the bearing retaining unit body, a heater is provided as the heat supplying device, and of the outer peripheral side of the first halved bearing in the bearing retaining unit body and the outer peripheral side of the second halved bearing in the cap, the heater is provided on the outer peripheral side of the second halved bearing in the cap, and is not provided on the outer peripheral side of the first halved bearing in the bearing retaining unit body.

4. A bearing structure for an internal combustion engine in which a rotational shaft of an internal combustion engine is supported by a radial plain bearing via lubricating oil and the radial plain bearing is retained by a bearing retaining unit, the bearing structure comprising:

a heat supplying device which supplies heat on an outer peripheral side of the radial plain bearing in the bearing retaining unit, wherein:

the bearing retaining unit comprises a bearing retaining unit body and a cap which is fastened to the bearing retaining unit body and which has a smaller thermal capacity than the bearing retaining unit body, the radial plain bearing comprises a first halved bearing retained on the bearing retaining unit body and a second halved bearing retained on the cap, of an outer peripheral side of the first halved bearing in the bearing retaining unit body and an outer peripheral side of the second halved bearing in the cap, the heat supplying device supplies heat on the outer peripheral side of the second halved bearing in the cap and does not supply heat on the outer peripheral side of the first halved bearing in the bearing retaining unit body, and a thermal insulation layer is provided on an outer peripheral surface of the rotational shaft.

\* \* \* \* \*